US012640511B2

(12) United States Patent
Zhao et al.

(10) Patent No.: US 12,640,511 B2
(45) Date of Patent: May 26, 2026

(54) ELECTRICAL CONNECTOR WITH AN IMPROVED TERMINAL MODULE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Xia Zhao, Kunshan (CN); Jian-Kuang Zhu, Kunshan (CN); Xiao-Gao Yang, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 453 days.

(21) Appl. No.: 18/195,034

(22) Filed: May 9, 2023

(65) Prior Publication Data

US 2023/0369797 A1 Nov. 16, 2023

(30) Foreign Application Priority Data

May 14, 2022 (CN) ......................... 202210525098.7

(51) Int. Cl.
*H01R 13/52* (2006.01)
*H01R 13/405* (2006.01)
*H01R 13/6581* (2011.01)

(52) U.S. Cl.
CPC ....... *H01R 13/405* (2013.01); *H01R 13/6581* (2013.01); *H01R 2201/26* (2013.01)

(58) Field of Classification Search
CPC .............. H01R 13/405; H01R 13/6581; H01R 2201/26; H01R 13/56; H01R 24/50; H01R 2201/06; H01R 13/40; H01R 13/02
See application file for complete search history.

(56) References Cited

U.S. PATENT DOCUMENTS 6,340,312 B1 * 1/2002 Ko ..................... H01R 13/6592 439/585
6,361,383 B1 * 3/2002 Ko ....................... H01R 9/0527 439/585
(Continued)

FOREIGN PATENT DOCUMENTS

CN 206271943 U 10/2021
CN 214542783 U 10/2021
(Continued)

*Primary Examiner* — Abdullah A Riyami
*Assistant Examiner* — Nelson R. Burgos-Guntin
(74) *Attorney, Agent, or Firm* — Ming Chieh Chang

(57) ABSTRACT

An electrical connector includes: a housing defining a mating cavity opening forwards and a receiving cavity opening rearwards; a terminal module including an insulator and a pair of terminals, the insulator including an upright portion and a horizontal portion; the terminal including a contacting portion extending from the insulator, a leg portion, and a middle portion, the middle portion including an horizontal section embedded in the insulator and an upright section bending from the horizontal section, the insulator being received in the receiving cavity, the contacting portions of the terminals protruding into the mating cavity; wherein the ring rib is interference fit with an inside of the receiving cavity and the upright portion presses forward against the housing to limit a forward-movement of the terminal module so that the terminal module is retained in the receiving cavity, and a front face of the horizontal portion is separated from the housing.

6 Claims, 5 Drawing Sheets

(56) References Cited

U.S. PATENT DOCUMENTS

| | | | | |
|---|---|---|---|---|
| 6,814,612 | B1 * | 11/2004 | Hu | H01R 13/6595 439/541.5 |
| 8,485,844 | B2 * | 7/2013 | Omae | H01R 13/6585 439/607.35 |
| 9,017,090 | B2 * | 4/2015 | Matsumoto | H01R 13/6275 439/350 |
| 9,077,116 | B2 * | 7/2015 | Pamart | H01R 13/6581 |
| 11,424,578 | B2 | 8/2022 | Droesbeke et al. | |
| 11,557,865 | B2 | 1/2023 | Liu et al. | |
| 2014/0120763 | A1 * | 5/2014 | Itsuki | H01R 13/533 439/382 |
| 2014/0120767 | A1 * | 5/2014 | Itsuki | H01R 13/5202 439/587 |
| 2015/0229067 | A1 * | 8/2015 | Nakai | H01R 13/405 439/587 |
| 2017/0077639 | A1 * | 3/2017 | Sundarakrishnamachari | H01R 13/4538 |
| 2018/0358731 | A1 * | 12/2018 | Endo | H01R 13/4361 |
| 2020/0099168 | A1 | 3/2020 | Inoue et al. | |
| 2021/0296814 | A1 * | 9/2021 | Komori | H01R 13/502 |
| 2023/0369797 | A1 * | 11/2023 | Zhao | H01R 13/405 |

FOREIGN PATENT DOCUMENTS

| | | | |
|---|---|---|---|
| CN | 114792915 | A | 7/2022 |
| CN | 217239921 | U | 8/2022 |
| EP | 3618194 | A1 | 3/2020 |

* cited by examiner

ELECTRICAL CONNECTOR WITH AN IMPROVED TERMINAL MODULE

BACKGROUND OF THE INVENTION

Field of the Invention

The present invention relates generally to an electrical connector with an improved terminal module.

Description of Related Arts

China Patent No. CN214542783U discloses a car Ethernet electrical connector for high speed transmission, which includes a plug connector and a receptacle connector. The receptacle connector includes an inner insulator retaining the terminals and a cast shell, wherein the insulator is inserted and retained in the cast shell. The connector may not meet a higher speed transmission performance.

An improved electrical connector is desired.

SUMMARY OF THE INVENTION

An object of the present invention is to provide an electrical connector with an improved terminal module.

To achieve the above-mentioned object, an electrical connector comprises: a housing defining a mating cavity opening forwards and a receiving cavity opening rearwards; and a terminal module comprising an insulator and a pair of terminals, the insulator comprising an upright portion and a horizontal portion extending forward from the upright portion, the terminal comprising a contacting portion extending from the insulator, a leg portion, and a middle portion connecting with the contacting portion and the leg portion, the middle portion comprising a horizontal section embedded in the insulator and an upright section bending from the horizontal section, the insulator being received in the receiving cavity, the contacting portions of the pair of the terminals protruding into the mating cavity, wherein the ring rib of the horizontal portion is interference fit with an inside of the receiving cavity of the housing and the upright portion presses forward against the housing to limit a forward-movement of the terminal module so that the terminal module is retained in the receiving cavity, and a front face of the horizontal portion is separated from the housing.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
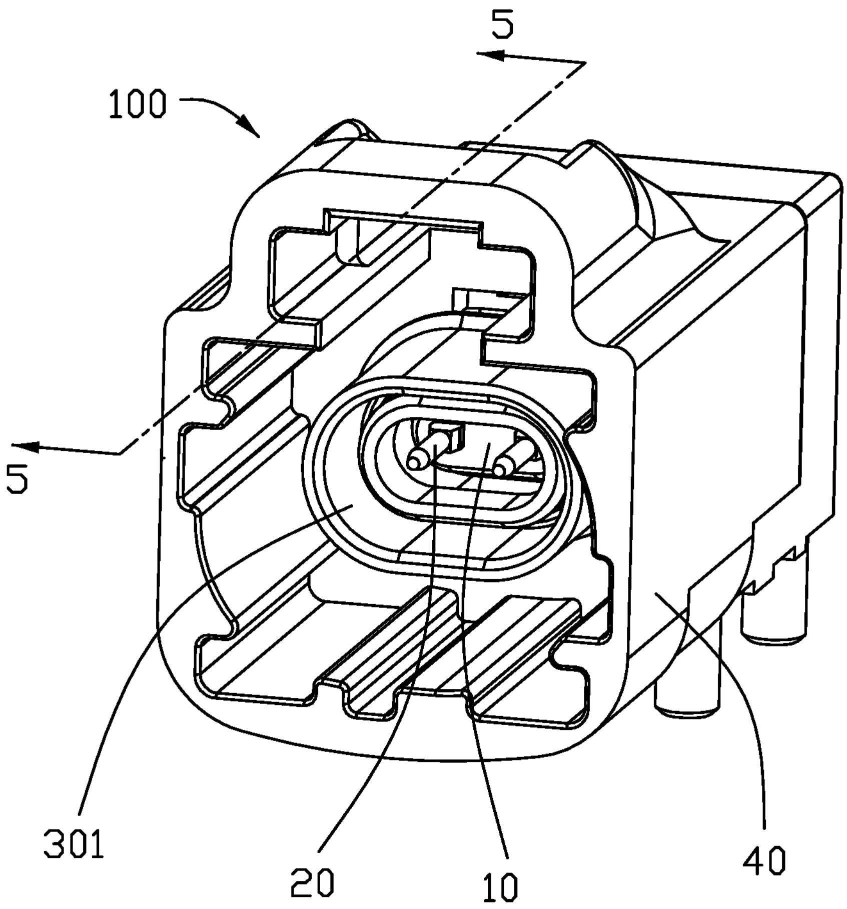
FIG. 1 is a front and top perspective view of an electrical connector according to an embodiment of this present invention.
Figure 2:
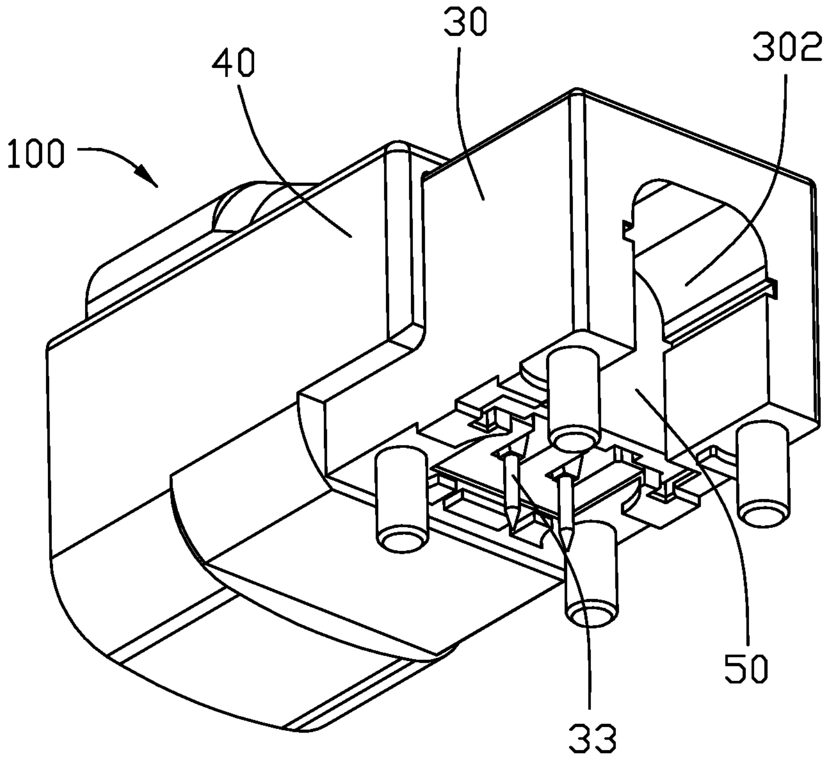
FIG. 2 is a rear and bottom perspective view of the electrical connector in FIG. 1.
Figure 3:
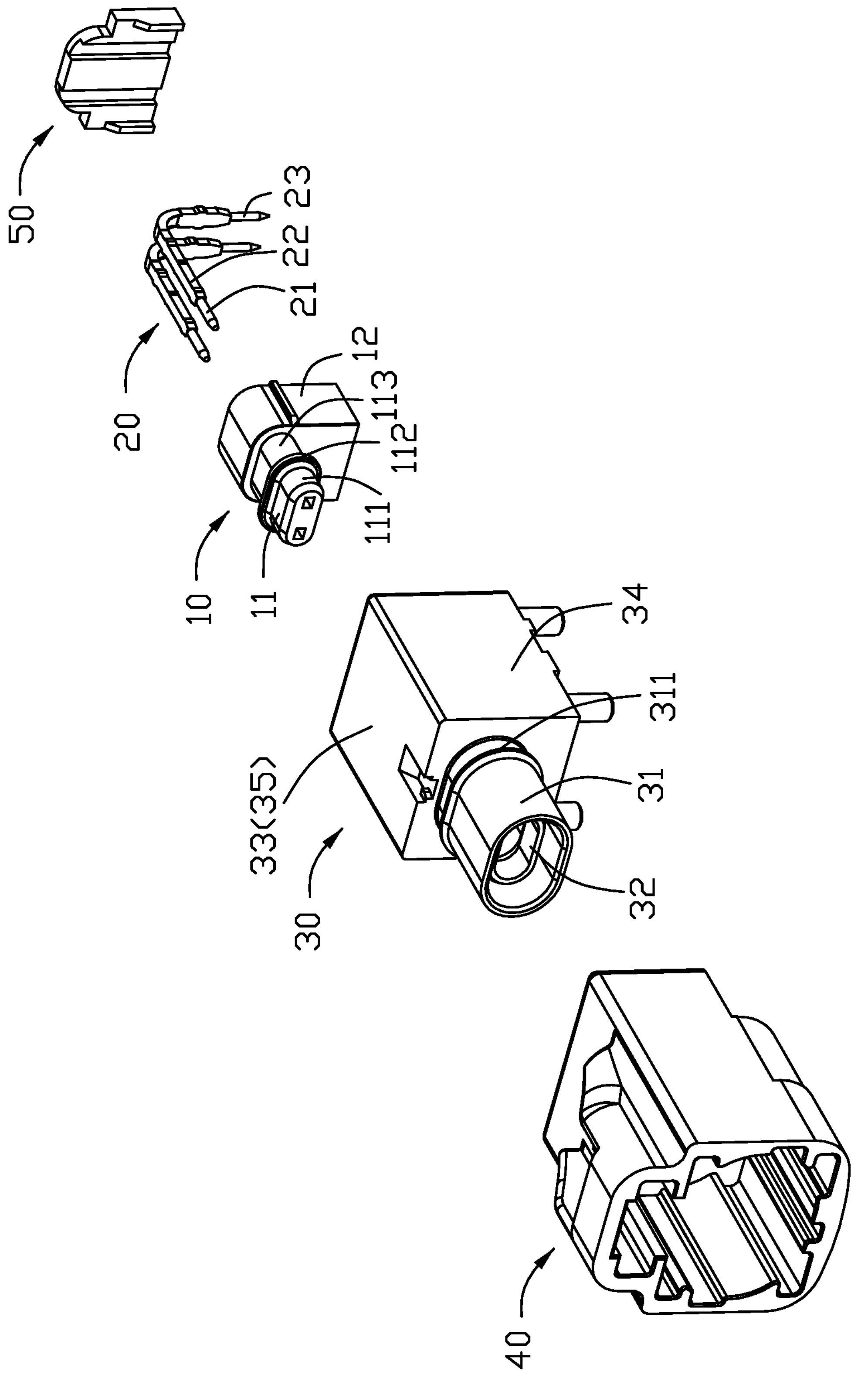
FIG. 3 is an exploded perspective view of the electrical connector in FIG. 1.
Figure 4:
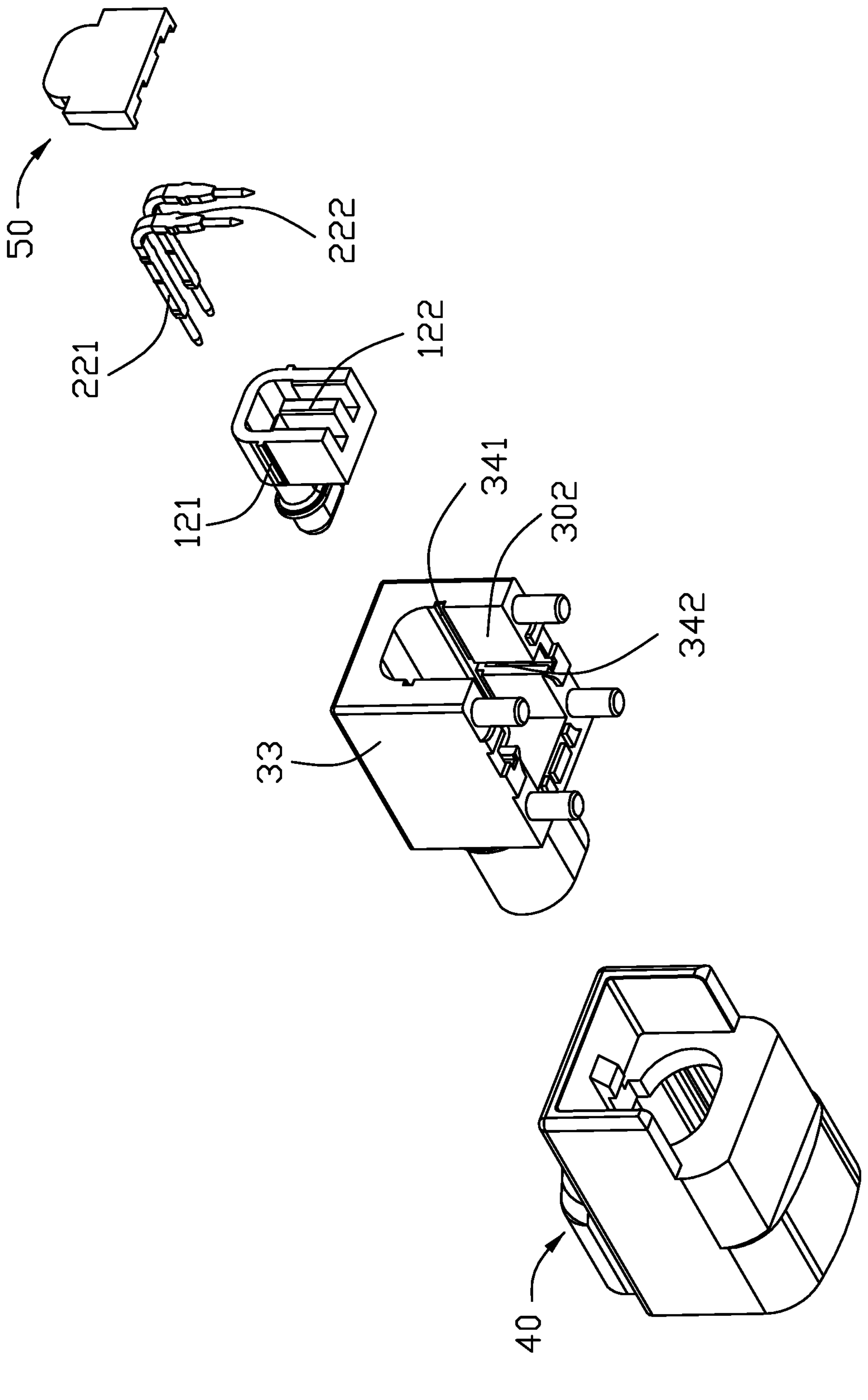
FIG. 4 is an exploded perspective view of the electrical connector in FIG. 2.

Reference will now be made to the drawing figures to describe the preferred embodiment of the present invention in detail.

Referring to FIGS. 1-5, an electrical connector 100 is illustrated, which is used for a high speed transmission in vehicles and needs a higher shielding performance. The electrical connector 100 includes a housing 30 made from metal material, a terminal module retained in the housing 30 and an outer shell 40 made from insulating material and disposed for receiving the housing 30 therein. The terminal module includes an insulator 10 and a pair of signal terminals 20, the pair of terminals 20 is retained in the insulator 10 by an injection molded process.

The insulator 10 in this embodiment includes a horizontal portion 11 and an upright portion 12 integrated and extending from the horizontal portion 11. The insulator 10 is retained in the housing 30 by interfered force. The insulator 10 defined a first ring groove 111 and a second groove 113 arranged in a front-rear direction and separated by a ring rib 112 and each around an outside of the insulator 10, so that the insulating material around the terminals 10 decreases, resulting in dielectric constant around the terminals 20 decreasing. More specifically, the first ring groove 111 opens forward, the ring rib 112 is interfered with the inside of the housing 30 to retain the terminal module in the housing 30. The top of the upright portion 12 presses against the inside of the housing 30, the upright portion 12 defines a guiding rib 121 at each side thereof, the guiding rib 121 extends horizontally and defines a slantwise guiding face at a front face thereof. The upright portion 12 defines a rear opening and a lower opening, through which the terminals 20 are assembled. Viewed from a rear side of the connector 100, the upright portion 12 defines a partitioning wall 122, the two terminals 20 are separated at opposite sides of the partitioning wall 122.

The terminal 20 includes a contacting portion 21 extending forwards from the insulator 10, a leg portion 23 and a middle portion 22 connecting with the contacting portion 21 and the leg portion 23, a horizontal section 221 of the middle portion 22 is embedded in the horizontal portion 11 of the insulator 10, an upright section 222 is retained in the upright portion 12 of the insulator and exposed to a rear exterior. The upright sections 222 of the two terminals 20 are separated at opposite sides of the partitioning wall 122. The contacting portions 21 and the leg portions 23 are of a needle shape, the middle portions 22 are of a rectangular column. The ring rib 112 of the horizontal portion is interfered with the inside of the receiving cavity of the housing and the upright portion press forward against the housing to limit a forward-movement of the terminal module so that the terminal module is retained in in the receiving cavity 302, a front face 114 of the horizontal portion 11 is separated from the housing 30.

Figure 5:
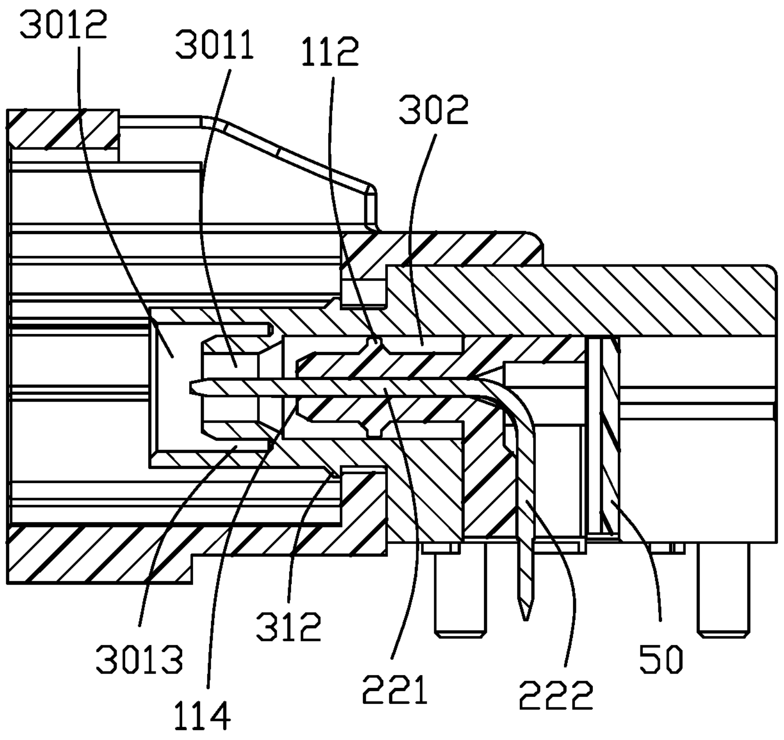
FIG. 5 is a cross-section of the electrical connector taken along line 5-5 in FIG. 1.

The housing 30 surrounds the terminal module and includes an outer tube 31 and an inner tube 32. Referring to FIG. 5, the inner tube and the outer tube are arranged in a concentric pattern, the housing 30 defines a mating cavity 301 opening forwards and a receiving cavity 302 opening rearwards. The mating cavity 301 includes a first or inner mating cavity 3011 in the inner tube 32 and a second or outer mating cavity 3012 in the outer tube 31, the first mating cavity 3011 is located in the second mating cavity 3012 and the second mating cavity 3012 extends forwards beyond the first mating cavity 3011. A ring cavity 3013 remains between the inner tube 32 and the outer tube 31. The outer tube 31 extends forwards beyond the inner tube 32. The contacting portions 21 of the terminals 20 extend across the first mating cavity 3011 and into the second mating cavity 3012. The insulator 10 with the terminals 20 is inserted into the receiving cavity 302, the outside of the insulator 10 is interfered with the inside of the housing 30 so as to retain the insulator 10 in the receiving cavity 302. A front face of the horizontal portion is separated from the receiving cavity with a gap as shown in FIG. 5. Further, the outside of the insulator 10 is defined hollow partially to decrease dielectric constant of the insulator 10. The change of the distance of the contacting portions 21 from the insulator 10 results in the change of dielectric constant and the resist of terminals 20. The insulator 10 does not extend into the mating cavity 301. The outer tube 31 defines a ring rib 311 at an outside thereof, the ring rib 311 presses rearwards against the outer shell 40. The ring rib 311 of the housing is located in front of the ring rib 112 of the insulator. The housing 30 includes a rear frame portion 33 which includes two opposite side walls 34 and a top wall 35 commonly defining the receiving cavity 302. The receiving cavity 302 opens rearwards and downwards. The upright portion 12 is located in the receiving cavity 302. The side wall 34 defines a first or horizontal slot 341 and a second or upright slot 342 at an inside thereof, the first slots 341 run through the rear ends of the side walls and guide the assembly of the guiding ribs 121, the second slots 342 run through the bottom ends of the side walls.

The outer shell 40 is located at the outside of the housing 30, the housing and the terminal module are assembled into the outer shell 40, a rear portion of the frame portion 33 is exposed upon an exterior of the insulating shell 40. A positioning member 50 is assembled into the second slot 342 from a bottom of the housing 30 to shield a rear end of the insulator 10. Please notes, a front end of the connector is defined to be mated with a complementary connector.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

a housing defining a mating cavity opening forwards and a receiving cavity opening rearwards; and a terminal module comprising an insulator and a pair of terminals, the insulator comprising an upright portion and a horizontal portion extending forward from the upright portion, the horizontal portion having a ring rib, the terminal comprising a contacting portion extending from the insulator, a leg portion, and a middle portion connecting with the contacting portion and the leg portion, the middle portion comprising a horizontal section embedded in the insulator and an upright section bending from the horizontal section, the insulator being received in the receiving cavity, the contacting portions of the pair of the terminals protruding into the mating cavity;

wherein the ring rib of the horizontal portion is interference fit with an inside of the receiving cavity of the housing and the upright portion presses forward against the housing to limit a forward-movement of the terminal module so that the terminal module is retained in the receiving cavity, and a front face of the horizontal portion is separated from the housing; and wherein the upright sections of the terminals are exposed rearwards and separated by a partitioning wall defined on the insulator.

2. The electrical connector as claimed in claim 1, wherein the horizontal portion defines a horizontal guiding rib at each side thereof to be received in a horizontal slot defined on the inside of the receiving cavity.

3. The electrical connector as claimed in claim 1, comprising an outer shell assembled on the housing, wherein the housing defines a ring rib at an outside of the outer tube, and the ring rib presses against an inside of the outer shell.

4. The electrical connector as claimed in claim 3, wherein the ring rib of the insulator is located in front of the ring rib of the housing.

5. The electrical connector as claimed in claim 4, wherein the housing is made from metal material.

6. The electrical connector as claimed in claim 1, wherein the housing comprises an inner tube and an outer tube in a concentric pattern, the outer tube protrudes forward beyond the inner tube and a ring cavity is defined between the outer tube and the inner tube, and the mating cavity is defined in the inner tube.

* * * * *